United States Patent Office 3,530,188
Patented Sept. 22, 1970

3,530,188
BROMOMETHYLBENZOPHENONES AND
RELATED COMPOUNDS
Dong H. Kim, Strafford, Arthur A. Santilli, Havertown,
Theodore S. Sulkowski, Narberth, and Scott J. Childress, Philadelphia, Pa., assignors to American Home
Products Corporation, New York, N.Y., a corporation
of Delaware
No Drawing. Continuation-in-part of application Ser. No.
581,751, Sept. 26, 1966. This application Feb. 26, 1968,
Ser. No. 707,971
Int. Cl. C07c 49/80; C07d 63/12, 5/16
U.S. Cl. 260—591                               8 Claims

ABSTRACT OF THE DISCLOSURE

The disclosure is directed to bromomethylbenzophenones and related compounds. The compounds are useful as intermediates in the synthesis of hexahydro-2,5-benzodiazocines which are known to possess pharmacological activity.

---

This application is a continuation-in-part of application Ser. No. 581,751, filed Sept. 26, 1966 by D. H. Kim, A. A. Santilli, T. S. Sulkowski and S. J. Childress, and entitled "Bromomethylbenzophenones and Related Compounds," and now abandoned.

This invention relates to new and novel bromomethylbenzophenones and related compounds which are valuable intermediates in the synthesis of hexahydro-2,5-benzodiazocines which are known to possess pharmacological activity.

The new and novel compounds of this invention are represented by the following formula:

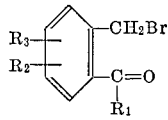

wherein $R_1$ is selected from the group consisting of phenyl, lower alkoxyphenyl, nitrophenyl, halophenyl, halo(lower)alkylphenyl, thienyl, and furyl; and $R_2$ and $R_3$ are both selected from the group consisting of hydrogen, halogen, lower alkoxy, nitro, and halo(lower)alkyl. Examples thereof are: 2'-bromomethyl-4-chlorobenzophenone; 2'-bromomethyl-3',4'-dichlorobenzophenone; and 2,4-dibromo-2'-bromomethylbenzophenone.

The new and novel compounds of the present invention may be prepared by the following schematic reaction scheme:

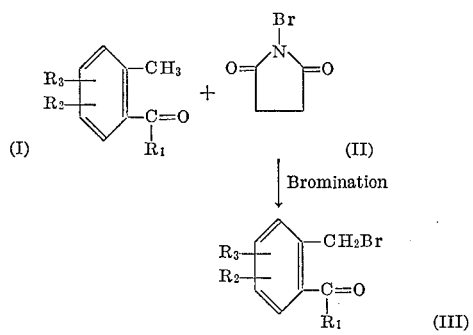

wherein $R_1$, $R_2$ and $R_3$ have the same meaning as previously set forth. The reaction is effected by dissolving a 2-methylphenyl ketone (I) in a reaction-inert organic solvent, such as carbon tetrachloride, and then reacting it with one molar equivalent of N-bromosuccinimide (II), in the presence of a free radical initiator for about forty-five minutes at about reflux temperatures. When the reaction is complete, the 2'-bromomethylphenyl ketone (III) is separated by conventional means, such as, concentration and recrystallization.

By reaction-inert organic solvent as employed herein is meant an organic solvent which dissolves the reactants but will not prevent or interfere with their interaction. While the preferred brominating agent is N-bromosuccinimide, it will be apparent to those skilled in the art that other brominating agents may be employed, for example, those described by L. Horner and E. H. Winkelmann in W. Foerst, "Newer Methods of Preparative Organic Chemistry," vol. III, p. 151–, Academic Press, New York 1964. The free radical initiators which are preferred in the above reaction are benzoylperoxide and dibenzoylperoxide, while other suitable initators are exemplified by the diacyl peroxides, the diaryl peroxides and discrete ultraviolet radiation. The amount of solvent used in the aforesaid reaction is not critical, it being only necessary to use a sufficient amount of solvent to provide a reaction medium for the particular reactants.

Many of the reactants employed in the above described process to prepare the compounds of the present invention are known compounds which are readily available from commercial sources, while the remainder can easily be prepared in accordance with standard organic procedures well known to those skilled in the art of chemistry. In accord with the present invention the 2'-bromomethyl phenyl ketone compounds (III) herein described have been found to be valuable intermediates in a novel process for the synthesis of the pharmacologically active hexahydro-2,5-benzodiazocines. The process in which these compounds are utilized is disclosed in copending U.S. patent application, Ser. No. 581,750, filed Sept. 21, 1966 by Kim et al. and entitled "Process for Preparing Hexahydro-2,5-Benzodiazocines."

EXAMPLE I

A well blended mixture of 5.9 g. of N-bromosuccinimide and 0.1 g. of benzoylperoxide is added to 100 ml. of warm, anhydrous carbon tetrachloride solution containing 11.5 g. of 4-chloro-2'-methylbenzophenone. The resulting mixture is heated to boiling with occasional shaking, refluxed for forty-five minutes and then filtered while hot to remove succinimide. The filtrate is concentrated under reduced pressure to a green colored oil which crystallizes on scratching. Recrystallization from petroleum ether (B.P. 60–90° C.), using decolorizing charcoal, affords 4.1 g. of 2'-bromomethyl-4-chlorobenzophenone (M.P. 84–87° C.).

Analysis.—Calcd. for $C_{14}H_{10}BrClO$ (percent): C, 54.31; H, 3.26; Br, 25.81; Cl, 11.45. Found (percent): C, 54.42; H, 3.15; Br, 25.35; Cl, 11.2.

In a similar manner, 5 - bromo - 2 - bromomethylbenzophenone; and 2 - bromomethyl - 3-chlorobenzophenone are synthesized.

EXAMPLE II

A mixture of 12.0 g. of N-bromosuccinimide and 0.2 g. of dibenzoylperoxide is added to 200 ml. of warm anhydrous carbon tetrachloride solution containing 23.0 g. of 3,4-dichloro-2-methylbenzophenone. The resulting mixture is heated to boiling with occasional shaking, refluxed for forty-five minutes, and then filtered while hot. The filtrate is concentrate under reduced pressure and the product is recrystallized from petroleum ether (B.P. 60–90° C.), using decolorizing charcoal, to afford 2-bromomethyl-3,4-dichlorobenzophenone.

Similarly, by brominating 4 - bromo - 2' - methylbenzophenone, there is obtained 2' - bromomethyl - 4 - bromobenzophenone.

EXAMPLE III

A blended mixture of 3.0 g. of N-bromosuccinimide and 0.5 g. of benzoylperoxide is added to 50 ml. of warm anhydrous carbon tetrachloride solution containing 6.0 g. of 2,4 - dibromo - 2' - methylbenzophenone. The resulting mixture is heated to boiling with occasional shaking, refluxed for forty five minutes and filtered while hot. The filtrate is concentrated under reduced pressure and the product is recrystallized from petroleum ether (B.P. 60–90° C.), using decolorizing charcoal, to afford 2,4 - dibromo-2'-bromomethylbenzophenone.

In the above manner, 4 - methoxy - 2' - methylbenzophenone is brominated to afford 2' - bromomethyl - 4-methoxybenzophenone.

EXAMPLE IV

A mixture of 18.0 g. of N-bromosuccinimide and 0.3 g. of dibenzoylperoxide is added to 300 ml. of warm anhydrous carbon tetrachloride solution containing 22.0 g. of 2 - thienyl - 2' - tolyl ketone. The resulting mixture is heated to boiling with stirring, refluxed for forty-five minutes and then filtered while hot to remove the precipitated succinimide. The filtrate is concentrated under reduced pressure and the product is recrystallized from petroleum ether, using decolorizing charcoal to yield 2'-(2-bromotolyl)-2-thienyl ketone.

Similarly, the following compound is obtained: 2' - (2-bromotolyl)-2-furyl ketone.

EXAMPLE V

When the procedure of the aforementioned examples is employed, reacting an appropriate 2-methylbenzophenone with N-bromosuccinimide, the following products are obtained:

2-bromomethyl-6-chlorobenzophenone;
2-bromomethyl-5-methoxybenzophenone;
2-bromomethyl-5-trifluoromethylbenzophenone;
2-bromomethyl-4,5-dichlorobenzophenone;
2-bromomethyl-4-nitrobenzophenone;
2'-bromomethyl-4-fluorobenzophenone;
2'-bromomethyl-4-ethoxybenzophenone;
2'-bromomethyl-4-trifluoromethylbenzophenone; and
2'-bromomethyl-4-dichloromethylbenzophenone.

EXAMPLE VI

An admixture of 6.0 g. of N-bromosuccinimide and 0.1 g. of dibenzoylperoxide is added to 100 ml. of warm anhydrous carbon tetrachloride solution containing 7.2 g. of 3 - fluoro - 2' - methylbenzophenone. The reaction mixture is refluxed, with stirring, for forty-five minutes, filtered while hot and concentrated under vacuum. The residue is recrystallized from petroleum ether, using decolorizing charcoal, to yield 2' - bromomethyl - 3 - fluorobenzophenone.

EXAMPLE VII

A well blended mixture of 30 g. of N-bromosuccinimide and 0.6 g. of benzoylperoxide is added to 600 ml. of warm, anhydrous carbon tetrachloride solution containing 48.0 g. of 4 - bromo - 2' - methyl - 5 - nitrobenzophenone. The resulting mixture is heated to boiling, with occasional shaking, and refluxed for forty-five minutes. Succinimide is removed from the reaction mixture by filtration. The filtrate is then concentrated under reduced pressure and the product recrystallized from petroleum ether (B.P. 60–90° C.), to afford 4 - bromo - 2' - bromomethyl - 5 - nitrobenzophenone.

EXAMPLE VIII

When the procedure of the prior examples is repeated to react the hereinafter listed 2' - methylbenzophenones with N-bromosuccinimide, the following compounds are obtained.

| Starting material: | Product |
|---|---|
| 2 - fluoro - 2' - methylbenzophenone | 2' - bromomethyl - 2 - fluorobenzophenone. |
| 4 - fluoro - 2 - methylbenzophenone | 2 - bromomethyl - 4 - fluorobenzophenone. |
| 2 - methylbenzophenone | 2 - bromomethylbenzophenone. |
| 2' - methyl - 4 - nitrobenzophenone | 2' - bromomethyl - 4 - nitrobenzophenone. |

EXAMPLE IX

An admixture of 6.0 g. of N-bromosuccinimide and 0.1 g. of benzoylperoxide is added to 100 ml. of warm anhydrous carbon tetrachloride solution containing 12.0 g. of 5 - trifluoromethyl - 2 - methylbenzophenone. The reaction mixture is heated to boiling with occasional shaking, refluxed for forty five minutes, and filtered while hot. The filtrate is concentrated under reduced pressure and the product is recrystallized from petroleum ether, using decolorizing charcoal, to yield 2 - bromomethyl - 5 - trifluoromethylbenzophenone.

In a similar manner, reacting 3 - dichloromethyl - 2-methylbenzophenone with N - bromosuccinimide there is obtained 2 - bromomethyl - 3 - dichloromethylbenzophenone.

What is claimed is:

1. A compound selected from the group consisting of those having the formula:

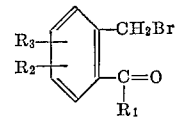

wherein $R_1$ is selected from the group consisting of phenyl, p-loweralkoxyphenyl, p - halophenyl, m - halophenyl, o-halophenyl, 2,4 - dihalophenyl, p - halomethylphenyl, thienyl and furyl; and $R_2$ and $R_3$ are selected from the group consisting of hydrogen, halogen, 5 - methoxy, 3-halomethyl and 5-halomethyl.

2. A compound as described in claim 1 which is: 2'-bromomethyl-4-chlorobenzophenone.

3. A compound as described in claim 1 which is: 2-bromomethyl-3,4-dichlorobenzophenone.

4. A compound as described in claim 1 which is: 2,4-dibromo-2'-bromomethylbenzophenone.

5. A compound as described in claim 1 which is: 2-bromomethylbenzophenone.

6. A compound as described in claim 1 which is: 2'-bromomethyl-4-fluorobenzophenone.

7. A compound as described in claim 1 which is: 2'-bromomethyl-4-methoxybenzophenone.

8. A compound as described in claim 1 which is: 2-bromomethyl-5-trifluoromethylbenzophenone.

References Cited

UNITED STATES PATENTS

| 3,375,246 | 3/1968 | Hardtmann et al. | 260—591 |
| 3,387,035 | 6/1968 | Gray et al. | 260—591 |

FOREIGN PATENTS

| 1,337,060 | 7/1963 | France. |

DANIEL D. HORWITZ, Primary Examiner

U.S. Cl. X.R.

260—332.3, 347.8, 239